United States Patent Office 3,846,240
Patented Nov. 5, 1974

3,846,240
PREPARATION OF A DUSTLESS POWDERY
PROTEASE-CONTAINING COMPOSITION
Yoshio Nakao, Osaka, Kiyoshi Nara, Kyoto, Kazuyoshi Katamoto, Osaka, and Kikuo Ito and Sakashi Ikeda, Yamaguchi, Japan, assignors to Takeda Chemical Industries, Ltd., Osaka, Japan
No Drawing. Filed Mar. 21, 1973, Ser. No. 343,474
Claims priority, application Japan, Mar. 25, 1972, 47/30,112
Int. Cl. C07g 7/02
U.S. Cl. 195—68
5 Claims

ABSTRACT OF THE DISCLOSURE

A dustless powdery protease-containing composition is prepared by a process involving the steps of bringing a wet precipitate from a culture broth containing the protease into contact with a hydrophilic organic solvent having a water content of about 15 to 30%, drying the resulting solvent-substituted wet precipitate until the content of solvent in the total precipitate becomes below 10%, pulverizing the dried precipitate into a powder and admixing the powder with a non-volatile wetting agent.

---

This invention relates to a process for producing a dustless powdery composition containing a protease from protease-containing wet precipitates, and also to the composition produced thereby.

Alkali proteases have been used as compounded with detergents since the proteases were found to show an excellent cleansing performance against proteinaceous stains under alkaline conditions in the presence of a detergent, and more demand is expected in future. The processes of their production are already known as described, for example, in French Patent Specification No. 2,001,575, Japanese Patent Publication No. 7432/1966, and Agricultural Biological Chemistry, Vol. 31, pages 642-643 (1967).

As was clarified in the precise search report by Food and Drug Administration in the United States, the alkali protease-containing detergents have been concluded as being usable as safely as the hitherto-used detergents. However, much care is required for avoiding allergy symptoms caused by inhalation of fine dust of the enzyme when the protease of a high potency is handled during the process of producing the enzyme or of compounding the same with a detergent.

The present inventors have found that a solid mass of proper hardness can be obtained by treating wet precipitates which have a protease activity and which were produced by *per se* known manner, such as precipitation means with the addition of a solvent, from the liquid part obtained by removing microbial cells from the culture broth, with a hydrophilic organic solvent containing 15 to 30% of water; then evaporating the aqueous solvent until the content of the solvent becomes lower than 10%; and drying the resultant mass. However, the solid mass of a proper hardness is still inconvenient in handling as it is and in any way has to be pulverized into small particles. At the pulverizing step, production of too fine particles is unavoidable though the amount may be minute, and therefore a danger of giving rise to fine dust still remains. Further investigation by the inventors for solving said problem led them to the finding that the fine dust can be suppressed when the powdered mass is further intermingled with a non-volatile wetting agent.

Thus, a principal object of the present invention is to provide an industrially feasible process for producing a dustless powdery protease composition which contains protease produced by the cultivation of a protease-producing microorganism.

Another object of this invention is to provide a dustless powdery protease composition which is useful, for example, as a component of detergents.

Said objects are realized by bringing protease-containing wet precipitates, which are prepared from a culture broth of a protease-producing microorganism, into contact with a hydrophilic organic solvent of a water content of about 15 to 30%; drying the solvent-substituted wet precipitates; pulverizing the dried precipitates into powders; and admixing the powder with a non-volatile wetting agent.

As the starting materials, as mentioned above, the precipitates which have a protease activity and which were obtained by removing microbial cells from the culture broth and then treating the resulting liquid part with *per se* known means such as solvent percipitation, separation by concentration and salting out, are used. As the details of said known means, reference is made to the above-cited publications on the production of alkali proteases. Thus, the wet precipitates mean here the materials which are obtained by removing the solid part such as microbial cells from the culture broth, then allowing an alkali protease-active fraction to precipitate from the resulting solution under supersaturated conditions made which can be attained by any means that are conventionally applied for the recovery of enzyme powders, e.g. the removal of solvent or the addition of an organic solvent or an inorganic salt, and finally separating the fraction by any means that is generally employed for the separation of a solid, e.g. filtration or centrifugation. The wet precipitates usually contain about 10 to 500% of water relative to their own dry weight.

The hydrophilic organic solvents which are usable for the present invention are those which have the property of being miscible with water and which do not deteriorate the enzyme potency, and are exemplified by lower alcohol (methanol, ethanol, propanol, isopropanol, etc.), lower aliphatic ketone (acetone, methyl ethyl ketone, etc.), lower cyclic ether (dioxane, tetrahydrofuran, etc.) or their mixtures.

When the wet precipitates are brought into contact with the hydrophilic organic solvent, too much water content in the aqueous solvent tends to make the desired alkali protease containing fraction slimy, whereby the subsequent separation of the fractions from the solvent becomes difficult. On the other hand, too little water content makes it impossible to get a proper hardness of the resulting solid mass. Thus, it is proper to use the hydrophilic organic solvent in association with water in a range of about 15 to 30% by volume, i.e. the aqueous hydrophilic organic solvent of a water content of about 15 to 30% by volume.

During the contact between the wet precipitates and the aqueous hydrophilic organic solvent, there occurs substitution of the solvent for the intrinsic solvent contained in the wet precipitates (hereinafter, such solvent contained in the wet precipitates as the intrinsic solvent may be referred to as "impregnated mother liquor"). For said solvent substitution, the simplest way is to allow the precipitates to be suspended in the solvent, preferably with gentle stirring.

The ratio of the solvent to be used to the wet precipitates should be such that provides a sufficient amount of the solvent for the complete replacement of the impregnated mother liquor, and usually falls within the range of about 3 to 20 times as much as the weight of the wet precipitates to be treated.

As the conditions for evaporating the solvent, those which are generally employed for drying enzymes are applicable without giving any problem, but it is convenient for an industrial handling to subject the mixture to filtration to collect the suspended precipitates (hereinafter, this may be referred to as "solvent-substituted wet precipitates") and then to subject them to drying procedure either under reduced pressure at an ambient temperature or in an air stream. The water content of the dried mass of precipitates is to be below about 10%, desirably about 0.5 to 2.0%, relative to the weight of the dry mass.

The next step is to disintegrate or pulverize the dry mass into powder and a usual disintegrator is used for the purpose. In order to lessen the yield of too fine powder it is recommended to use a cutter-type mill which functions as a pulverizer mainly owing to cutting comminution. Desirable size of the milled particles depends on the purpose of their use, but falls usually in the range of about 50 to 1000 microns in view of the fact that the size of too fine powders which are liable to cause the dust is usually below 50 microns. For realizing the purpose of this invention, it is desirable to assure at this stage that the percentage of the particles of said desirable size range in the powder be at least 60%, and it can easily be attained by means of a usual cutter-type mill.

Then, the milled particles are admixed with a non-volatile wetting agent. The term "non-volatile" means here that the wetting agent is not or hardly evaporated under ambient conditions, e.g. at a temperature of about 15° to 45° C. at an atmospheric pressure. Any of such non-volatile wetting agents can be used as far as they do not affect the enzyme activity adversely, and for the use of a component of detergents, they should also satisfy the competency as a component of detergents. Preferable wetting agents are usually liquid or oily under said ambient conditions, and are exemplified by polyethylene glycol (particularly, of an average molecular weight of about 200 to 600), liquid paraffin, glycerol, vaseline, polyoxyethylene alkylphenyl ether (particularly, of an average molecular weight of about 450 to 900), etc. Recommendable percentage of the non-volatile wetting agent relative to the weight of the milled particles, i.e. powder, is about 0.1 to 10%, more preferably 1 to 5%.

The foregoing description of the method of the present invention and the recovery of the starting material will further be concretely explained below by way of Preparations, Experiments and Examples.

In those descriptions, as well as in the foregoing, the abbreviations "L.," "ml.," "kg.," "g.," "mg.," "min." and "r.p.m." mean "liter(s)," "milliliter(s)," "kilogram(s)," "gram(s)," "milligram(s)," "minute(s)" and "revolution(s) per minute," respectively. The water contents of the solvent are shown in terms of percentages of water by volume relative to the total aqueous solvent. The percentages for the components of culture media are on the weight per volume basis, i.e. in terms of gram(s) per deciliter. Other percentages are on the weight basis unless otherwise noted.

The alkali protease potencies shown in these Experiments and Examples were determined by mixing 1.0 ml. of the enzyme solution to be tested and 0.5 ml. of a glycine butter solution of pH 10.5 with 0.5 ml. of a solution containing 20 mg. of Hammerstein casein, allowing the mixture to stand at 37° C. for 20 minutes, terminating the reaction by the addition of 3.0 ml. of a 5% aqueous trichloroacetic acid solution, allowing the mixture to stand at 37° C. for 30 minutes to precipitate the unreacted casein, filtering the precipitates, and measuring the amount of tyrosine liberated in the supernatant by the enzyme action. The unit of enzyme potency is defined as the amount producing 1 gamma of tyrosine under said conditions, and the potency shown by 1 mg. of the enzyme samples is shown as "Pu/mg."

Measurement of the dust level, which is a degree showing the liability of causing dust, was made by weighing the dust in milligram caused by 500 g. of the respective samples according to the method of an electrostatic air sampler proposed by M. H. Hendricks et al. (cf. Journal of American Oil Chemists Society, Vol. 47, page 207 et seq. (1970)).

PREPARATION 1

In a 2,000-L. tank was charged 1,000 L. of a liquid culture medium (adjusted at pH 6.0) comprising 13% of n-paraffin ($C_{10}$ to $C_{13}$), 7.0% of nucleic acid-extracted yeast (yeast for feedstuff produced by Takeda Chemical Industries, Ltd., Japan), 0.05% of magnesium sulfate, 0.01% of calcium chloride, 0.05% of ferrous sulfate, 0.8% of primary potassium phosphate, 0.2% of secondary potassium phosphate, 0.5% of polysorbate 60, 0.5% of soybean oil and 1.0% of calcium carbonate (precipitated). The medium was inoculated with Penicillium lilacinum (IFO 5350). The inoculated medium was incubated with aeration of 1,200 L./min. at 26° C. under agitation of 280 r.p.m. for 136 hours. A supernatant solution obtained by centrifuging the culture broth showed an alkali protease potency of 10,200 Pu/ml.

100 L. of the culture broth was centrifuged to obtain a supernatant, which was then concentrated to 5 L. Acetone was added to the concentrate to make the acetone concentration 35%, whereupon there occurred precipitates which were then eliminated. Further acetone was added to make the acetone content 65%, and the resultant precipitates were collected by filtration to obtain 2.1 kg. of wet precipitates, which contained 1.6 kg. of 65% acetone-water as the mother liquor.

PREPARATION 2

A culture medium of the same composition as used in Preparation 1 was inoculated with Fusarium oxysporum (IFO 4471) and the medium was incubated in the same manner to give a culture broth, which showed an alkali protease potency of 4,800 Pu/ml. 500 L. of the culture broth was treated in the same manner as in Preparation 1 to obtain 17.5 kg. of wet precipitates, which contained 12.5 kg. of 65% acetone-water as the mother liquor.

*Experiment 1*

In 10 L. of an aqueous acetone of water content 25% (at 15° C.) were suspended 2.1 kg. of the wet precipitates obtained in Preparation 1. The suspension was stirred gently for 30 minutes to substitute the solvent, for the impregnated mother liquor of the wet precipitates, and then filtered with a filter press. The resulting precipitates weighing 1.9 kg. were spread on a tray and dried at 40° C. under reduced pressure. After 16 hours drying, 580 g. of a dry mass of a potency of 1,200 Pu/mg. was obtained. This was pulverized in a cutting-type pulverizer (Feather Mill made by Hosokawa Tekkosho, Japan) to obtain powder showing the particle size distribution as shown in Table 1.

For control, wet precipitates prepared in the same manner as above was dehydrated completely with anhydrous acetone, and then dried and pulverized in the same manner. The obtained powder weighing 610 g. showed a potency of 1,100 Pu/mg. and a water content of 1.38%.

TABLE 1

| Particle size in microns | Treated with aqueous acetone of water content 25% | | Treated with anhydrous acetone | |
|---|---|---|---|---|
| | Before pulverization, percent | After pulverization, percent | Before pulverization, percent | After pulverization, percent |
| Over 500 | 98 | 14 | 92 | 0 |
| 500 to 300 | 1 | 35 | 3 | 0 |
| 300 to 100 | 1 | 31 | 2 | 8 |
| 100 to 50 | 0 | 10 | 1 | 9 |
| Below 50 | 0 | 10 | 2 | 83 |

As is clear from Table 1, the sample treated with the acetone of water content 25% shows a lessened dust generation during pulverization because of the solidification of the cake in the drying step. The cake obtained by the complete dehydration with anhydrous acetone, followed by drying, looked like a huge lump, but was very fragile and produced a lot of dust during pulverization.

*Experiment 2*

Each of the powders obtained in Experiment 1 by the treatment with acetone of water content 25% and by the treatment with the anhydrous acetone was diluted with anhydrous sodium sulfate of a particle size distribution between 50 to 500 microns to adjust the enzyme potency to 1,000 Pu/mg. Each weighed 500 g. and was put in a coating pan. A predetermined percentage of polyethylene glycol (mean molecular weight: 400) or liquid paraffin was sprayed evenly over the powder by means of a spray gun to obtain the respective powdery alkali protease-containing compositions, of which the dust levels were measured to give the results as shown in Table 2.

TABLE 2

| | Dust level on samples treated with— | |
|---|---|---|
| | Aqueous acetone of water content 25% (mg.) | Anhydrous acetone, (mg.) |
| Polyethylene glycol (amount sprayed): | | |
| 1% | 0.10 | 40 |
| 2% | 0 | 6.5 |
| 3% | 0 | 3.8 |
| 10% | 0 | 0.5 |
| Liquid paraffin (amount sprayed): | | |
| 1% | 0.15 | 58 |
| 2% | 0.05 | 18 |
| 3% | 0 | 6.3 |
| 10% | 0 | 0.7 |

As is clear from Table 2, the dried samples obtained by the treatment with the acetone of water content 25% were completely prevented from dust production by the spray of 3% of the polyethylene glycol or liquid paraffin; while the dried samples obtained by the dehydration with anhydrous acetone were not completely prevented from dust production even by the spray of 10% of said wetting agents, and though the dust could be suppressed by the spray of a much more amount, the resultant product turned to be sticky and slimy and was observed as not exhibiting the nature of powder any more.

Example 1

500 L. of the curture broth as obtained in Preparation 1 was centrifuged and the supernatant was concentrated to 25 L. To the concentrate was added acetone to make the acetone concentration 35% by volume, and the resulting precipitates were eliminated. To the solution was further added acetone to make the acetone concentration 65% by volume, and the resulting precipitates were collected by filtration to obtain 10.5 kg. of precipitates containing alkali protease. The precipitates were dissolved in 300 L. of water and 80 kg. of a resin powder (H+-type) of methacrylic acid-divinylbenzene copolymer (distributed, e.g. under the trade name "Amberlite CG-50" by Rohm & Haas, Co., U.S.A.) was added to the solution, whereupon the protease was adsorbed on the resin. After filtration, the resin was washed with 2,500 L. of water, and then eluted with 350 L. of a 10% aqueous sodium acetate solution to give 350 L. of the eluate. The eluate was salted out with 210 kg. of ammonium sulfate to give 2.6 kg. of precipitates. The precipitates were again dissolved in 10 L. of water and the solution was allowed to pass through a column packed with 100 L. of beads of the dextran bridged by epichlorhydrin (distributed, e.g. under the trade name "Sephadex G–25" by Pharmacia S.A., Sweden) to eliminate the mineral salts contained. The desalted effluent was further allowed to pass through the column of 50 L. of beads of carboxymethylated dextran (distributed, e.g. under the trade name "CM–Sephadex C–50" by Pharmacia S.A., Sweden) to adsorb the protease on the resin. The adsorbed protease was eluted out with 40 L. of a 0.15 M sodium chloride solution in 0.02M acetate buffer solution of pH 5.0. The effluent was salted out with 24 kg. of ammonium sulfate to obtain 2.1 kg. of the wet precipitates, which contained 0.8 kg. of 55% aqueous ammonium sulfate solution as the impregnated mother liquor but were highly purified and substantially consisted of alkali protease.

The precipitates were suspended in 25 L. of an aqueous methanol of the water content 30%. The suspension was gently stirred for 30 minutes, and was centrifuged to separate wet precipitates from the supernatant liquor. The wet precipitates, weighing 1.8 kg. was spread on a tray and was dried under reduced pressure at 50° C. After 12 hours drying, the resulting cakes weighing 600 g. showed protease potency of 4,000 Pu/mg. and a water content of 30%. The cakes were pulverized in Feather Mill into powder (particle size distribution: below 50 microns, 11.3%; between 50 and 500 microns, 88.7%) and the powder was admixed with a non-volatile wetting agent illustrated in Table 3 below to obtain the products. The respective dust levels were measured to turn out as shown below.

For control, dust level was also measured on the samples prepared in the same manner as above except for the use of anhydrous methanol for the aqueous methanol.

TABLE 3

| | Dust level on samples treated with— | |
|---|---|---|
| | Aqueous methanol of water content 30% (mg.) | Anhydrous methanol (mg.) |
| Polyethylene glycol of average (amount sprayed) molecular weight 400: | | |
| 1% | 0.2 | 350 |
| 2% | 0.18 | 10 |
| 3% | 0 | 7 |
| Liquid paraffin (amount sprayed): | | |
| 1% | 0.15 | 320 |
| 2% | 0.10 | 12 |
| 3% | 0 | 5 |

Example 2

About 20.5 kg. of wet precipitates obtained as in Preparation 1 was divided into two equal portions. One half, weighing 10.25 kg., was suspended in 25 L. of an aqueous dioxane of water content 25% to substitute the solvent, followed by separation to obtain 10.1 kg. of solvent-substituted wet precipitates. These were dried under reduced pressure at 45° C. to give 3.7 kg. of dried cakes. The cakes were pulverized in the same manner as in Example 1. The powder was admixed with one of polyethylene glycol (average molecular weight (M.W.): 400 and 600), liquid paraffin, and polyoxyethylene nonylphenylether (average repeating unit number of polyoxyethylene ($n$): 8 and 10), each in an amount of 3% relative to the weight of the powder to be admixed, to produce powdery alkali protease-containing compositions.

The other half, weighing 10.25 kg., was suspended in 25 L. of an aqueous ethanol of water content 15% to substitute the solvent, followed by separation of the solvent-substituted wet precipitates weighing 9.9 kg., which were then dried under reduced pressure at 45° C. to obtain 3.6 kg. of dry cakes showing an alkali protease potency of 1,190 Pu/mg. and a water content of 1.48%. The cakes were pulverized in the same manner as in Example 1, and the powder was admixed with one of said wetting agents, each in an amount of 3% relative to the weight of the powder admixed, to produce alkali protease-containing compositions.

Dust levels measured on those compositions are shown in Table 4.

TABLE 4

|  | Treated with— | |
|---|---|---|
|  | Aqueous dioxane of water content 25% (mg.) | Aqueous ethanol of water content 15% |
| Polyethylene glycol (M.W.=400), 3% | <0.2 | 0 |
| Polyethylene glycol (M.W.=600), 3% | <0.2 | 0 |
| Liquid paraffin, 3% | 0 | 0 |
| Polyoxyethylene nonylphenyl ether (n=8), 3% | 0 | 0 |
| Polyoxyethylene nonylphenyl ether (n=10), 3% | 0 | 0 |

Example 3

Wet precipitates, weighing 17.5 kg. prepared as in Preparation 2 were suspended in 100 L. of an aqueous acetone of water content 25%. The suspension was gently stirred for 30 minutes. The wet precipitates were washed with the solvent to complete the solvent substitution, and then filtered with a filter press to obtain 14.0 kg. of solvent-substituted wet precipitates. These were dried under reduced pressure at 55° C. to give 4 kg. of dry cakes showing an alkali protease potency of 480 Pu/mg. and a water content of 1.53%. The cakes were pulverized in a cutting type mill into powder (particle size distribution: below 50 microns, 12%; between 50 and 500 microns: 88%). The powder was admixed with one of polyethylene glycol (M.W.=400), liquid paraffin and polyoxyethylene nonylphenyl ether (n=10), each in an amount of either 1%, 2% or 3% relative to the weight of the powder to be admixed, to obtain the respective powdery alkali protease-containing compositions.

For control, samples were prepared in the same manner except for the use of anhydrous acetone for complete dehydration in place of the use of the aqueous acetone.

The dust levels of the respective products were measured to show the results shown in Table 5.

TABLE 5

|  | Dust level | |
|---|---|---|
|  | Treated with acetone of water content 25% (mg.) | Dehydrated with anhydrous acetone (mg.) |
| Polyethylene glycol: | | |
| 1% | 0.15 | 430 |
| 2% | 0 | 12 |
| 3% | 0 | 8 |
| Liquid paraffin: | | |
| 1% | 0.25 | 380 |
| 2% | 0.10 | 15 |
| 3% | 0 | 10 |
| Polyoxyethylene nonylphenyl ether: | | |
| 1% | 0.20 | 530 |
| 2% | 0.10 | 23 |
| 3% | 0 | 9 |

The IFO numbers attached to the respective microbial species names are accession numbers in Institute for Fermentation, Osaka, Japan and those strains had been available to public prior to this invention, as listed in the List of Cultures published by the culture collection.

What is claimed is:

1. Process for producing a dustless powdery composition containing a protease from protease-containing wet precipitates prepared from a culture broth of a protease-producing micro-organism, which comprises the steps of:
   (a) bringing the wet precipitates into contact with a hydrophilic organic solvent of a water content of about 15 to 30% selected from the group consisting of methanol, ethanol, propanol, isopropanol, acetone, methylethyl ketone, dioxane and tetrahydrofuran;
   (b) drying the resulting solvent-substituted wet precipitates until the content of the solvent in the total precipitates becomes below 10%;
   (c) pulverizing the dried mass of precipitates into powder, and
   (d) admixing the powder with 0.1 to 10% of a liquid or oily non-volatile wetting agent relative to the weight of the powder.

2. The process according to Claim 1, wherein the non-volatile wetting agent relative to the weight of the powder is about 1 to 5%.

3. The process according to Claim 1, wherein the content of the solvent in the dried mass to be pulverized is about 0.5 to 2.0%.

4. The process according to Claim 1, wherein the content of particles of the size between 50 and 1,000 microns in the powder is at least 60% by weight.

5. The process according to Claim 1, wherein the wetting agent is a polyethylene glycol of an average molecular weight of about 400 to 600.

References Cited

UNITED STATES PATENTS

| 3,737,376 | 6/1973 | Zitter | 195—63 |
| 3,650,967 | 3/1972 | Johnson | 195—63 |
| 3,607,653 | 9/1971 | Zitter et al. | 195—63 |
| 3,723,250 | 3/1973 | Aunstrup et al. | 195—62 |

DAVID M. NAFF, Primary Examiner

U.S. Cl. X.R.

195—63, 66 R